UNITED STATES PATENT OFFICE.

JOHN G. HUCKS, OF SAN FRANCISCO, CALIFORNIA.

IMPROVEMENT IN MEDICAL COMPOUNDS OR OINTMENTS.

Specification forming part of Letters Patent No. 139,315, dated May 27, 1873; application filed March 28, 1873.

*To all whom it may concern:*

Be it known that I, JOHN GEORGE HUCKS, of San Francisco city and county, State of California, have invented an Ointment; and I do hereby declare that the following description is sufficient to enable any person skilled in the art or science to which it most nearly appertains to make and use my said invention without further invention or experiment.

My invention relates to a compound which I call "Eureka Balsamic Ointment," and which is especially valuable as a base or vehicle with which the various drugs or medicines which are employed for healing purposes can be incorporated, in order to form an ointment or salve having the properties or healing qualities of the medicine or drug which is incorporated with it.

My compound is produced by the destructive distillation of resins obtained from the different species of pine-trees. The resin is first placed in a properly constructed still, where it is subjected to a high degree of heat, so as to produce a crude oil, which I call No. 1 oil. The crude oil is then redistilled to free it from the acids and impurities consequent on its first distillation. This I call No. 2 oil. Either or both of these oils can be used as a base or vehicle for any of the various healing drugs or medicines which are in common use.

The compound above described will not only form a convenient base or vehicle for healing medicines, but will itself possess great healing and balsamic properties.

The following is a recipe for forming an excellent healing ointment by the use of my base or vehicle. Proportions of ingredients in one hundred pounds: Forty (40) pounds No. 2 oil, above described; fifteen (15) pounds pure fresh lard; five (5) pounds sifted hydrate of lime; eight (8) pounds distilled water; two (2) pounds alcohol, ninety-five per cent.; four (4) pounds fresh palm-oil; two (2) pounds Canadian balsam, made warm. These ingredients are to be added together in the order in which they are mentioned and well mixed in a suitable vessel. Then grind the following ingredients to a powder and mix with the mixture above decribed. Two (2) pounds of alum, one (1) pound gum camphor, thirteen ounces sulphur, three ounces concentrated potash. The whole to be thoroughly incorporated and ground through a paint-mill. Then add twenty (20) pounds of No. 1 oil, and mix quickly and pour into suitable cans. In ten minutes time it will become of a consistency of butter, not liquefying under 200° Fahrenheit.

Having thus described my invention, what I claim, and desire to secure by Letters Patent, is—

1. Crude or refined resin-oils as a base, in combination with healing drugs or medicines to form an ointment, substantially as set forth.

2. A healing ointment, composed of the ingredients above enumerated, mixed and compounded in the proportions specified.

In witness whereof I hereunto set my hand and seal.

JOHN GEORGE HUCKS. [L. S.]

Witnesses:
    JOHN J. HUCKS,
    C. M. RICHARDSON.